(12) United States Patent
Jain et al.

(10) Patent No.: US 7,594,049 B1
(45) Date of Patent: *Sep. 22, 2009

(54) APPLICATION PROGRAM INTERFACE ACCESS TO HARDWARE SERVICES FOR STORAGE MANAGEMENT APPLICATIONS

(76) Inventors: Arvind Jain, 850 Harbins Cove Dr., Lilburn, GA (US) 30047; Sukha Ghosh, 5332 Candleberry Dr., Lilburn, GA (US) 30047; Debasis Dalapati, 3040 Roxburgh Dr., Roswell, GA (US) 30076

( * ) Notice: Subject to any disclaimer, the term of this patent is extended or adjusted under 35 U.S.C. 154(b) by 216 days.

This patent is subject to a terminal disclaimer.

(21) Appl. No.: 11/472,677

(22) Filed: Jun. 22, 2006

Related U.S. Application Data

(63) Continuation of application No. 10/428,638, filed on May 2, 2003, now Pat. No. 7,093,038.

(60) Provisional application No. 60/380,160, filed on May 6, 2002.

(51) Int. Cl.
*G06F 3/00* (2006.01)
*G06F 13/00* (2006.01)

(52) U.S. Cl. ............... 710/62; 710/5; 710/7; 710/74; 711/203; 718/1; 718/100; 370/355; 370/535

(58) Field of Classification Search .............. 710/5, 710/7, 62, 74; 370/535, 355; 718/1, 100; 711/203
See application file for complete search history.

(56) References Cited

U.S. PATENT DOCUMENTS

| | | | |
|---|---|---|---|
| 6,192,471 B1 * | 2/2001 | Pearce et al. ................. 713/2 |
| 6,341,329 B1 * | 1/2002 | LeCrone et al. ............ 711/112 |
| 6,845,403 B2 * | 1/2005 | Chadalapaka ................ 710/5 |
| 7,173,929 B1 * | 2/2007 | Testardi ..................... 370/355 |
| 7,280,536 B2 * | 10/2007 | Testardi ..................... 370/355 |

* cited by examiner

*Primary Examiner*—Tammara Peyton
(74) *Attorney, Agent, or Firm*—Brian Anderson

(57) ABSTRACT

A method and device for using a set of APIs are provided. Some of the functions which used to be performed by software are now accelerated through hardware.

2 Claims, 7 Drawing Sheets

APPLICATION PROGRAM INTERFACE ACCESS TO HARDWARE SERVICES FOR STORAGE MANAGEMENT APPLICATIONS

This application claims is a continuation application of the utility application filed May 2, 2003 now U.S. Pat. No. 7,093,038 titled "APPLICATION PROGRAM INTERFACE ACCESS TO HARDWARE SERVICES FOR STORAGE MANAGEMENT APPLICATIONS" with a Ser. No. 10/428,638, which claimed priority to Provisional Application No. 60/380,160 filed May 6, 2002, entitled "APPLICATION PROGRAM INTERFACE-ACCESS TO HARDWARE SERVICES FOR STORAGE MANAGEMENT APPLICATIONS, which is hereby incorporated in its entirety by reference.

BACKGROUND OF THE INVENTION

1. Field of the Invention

The present invention generally relates to an application program interface (API), more specifically, the present invention relates to an API having access to hardware services for storage management applications. Yet more specifically, the present invention relates to a Virtualization Acceleration Application Programming Interface (VAAPI)

2. Description of the Related Art

Application program interface (API) also known as application programming interface is known in the art. API can be considered as a set of specific methods prescribed by a computer operating system or by an application program, which a programmer who is writing an application program can make request of the operating system or another application.

The explosive growth if storage networks is being driven by the collaboration of business computing and the need for business continuity. The storage data management silicon model makes the assumption that the next logical step in managing storage networks is to move some of the storage management functionality into storage network with the implementation located in switches, router, appliances, NAS and SAN attached arrays. This model envisions storage virtualization application implemented onto storage network nodes using specialized storage data management silicon to ensure that the node does not become a severe performance bottleneck to the network traffic flowing through it.

To implement storage virtualization in the network, the storage virtualization application is effectively split into two function components; the control path and the data path, as shown in FIG. 1. The control path is responsible for all of the control functions of virtualization; including setting up the configuration, changing the configuration, network and availability management, fault tolerance, and error recovery. The data path component is responsible for moving the I/O through the virtualization application.

The performance characteristics of the storage virtualization engine in this paradigm depends on the amount of the data path that is implemented in hardware. A silicon-assisted solution can significantly reduce latencies over software solutions and increase IOP performance many times.

Therefore, it is desiouse to have specialized APIs residing in the datapath. Further, it is desiouse to have a storage network I/O handling framework and a set of APIs for better performance.

SUMMARY OF THE INVENTION

A storage network I/O handling system including a set of APIs are provided for enabling the separation of Control path (configuration and complex exception handling) and data path (storage I/O execution and relatively simpler exception handling) related computing.

A storage network I/O handling system including a set of APIs is provided, in which the data path processing is kept relatively simple in comparison to control path processing and the system is being accelerated with specialized hardware (HW) for achieving higher performance.

A storage network I/O handling system including a set of specialized APIs is provided for defining abstracted interfaces to the configuration information repository from the Storage Management applications in the control path.

A storage network I/O handling system including a set of APIs is provided for defining a set of APIs for device configuration, configuration loading, exception reporting, and access to HW accelerated I/O processing pipeline such as a storage management processor.

A storage network I/O handling system including a set of APIs is provided for optimizing storage network environments with emphasis on performance and ease of development.

A storage network I/O handling system including a set of APIs is provided for facilitating implementations with 10x or greater performance scalability characteristics as compared to known processor implementations A storage network I/O handling system including a set of APIs is provided with the system further having an extensible and partition-able framework that allows easy integration with a vendor's unique content and APIs A storage network I/O handling system including a set of APIs is provided for leveraging the industry standardization efforts as much as possible. For example, CIM and WBEM are heavily leveraged in the repository component of the present application.

A storage network I/O handling system including a set of APIs is provided for easy adaptation for implementations other than only CIM/WBEM, including SNMP and proprietary interfaces A storage network I/O handling system including a set of APIs is provided for a wide adoptablity, or support to other vendor storage systems.

Accordingly, a storage network I/O handling system including a set of APIs is provided.

Accordingly, a method is provided. The method includes: providing a virtual disk for an I/O request; providing an I/O execution plan based upon the I/O request; providing an I/O plan executor in hardware; and using the I/O plan executor to execute the I/O plan, thereby at least some storage related function are performed by the I/O plan executor in hardware.

Accordingly, a storage virtualization engine coupled to a control path and a data path is provided. The engine comprising: a software sub-engine having the control path and data path; and a virtualization repository; a hardware sub-engine having an accelerated data path; an VAAPI coupling the software sub-engine with the hardware sub-engine; a management application coupled to the software sub-engine, wherein command therefrom are processed by the control path, thereby some function are performed by hardware through the VAAPI and data are accelerated through the accelerated data path.

Accordingly, a storage management system having a control path and a data path is provided. The system comprising: a storage virtualization engine, the engine includes: a software sub-engine having the control path and data path; and a virtualization repository; a hardware sub-engine having an accelerated data path; an VAAPI coupling the software sub-engine with the hardware sub-engine; a management application coupled to the software sub-engine, wherein command therefrom are processed by the control path, thereby some function are performed by hardware through the VAAPI and data are accelerated through the accelerated data path.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides a Virtualization Acceleration Application Programming Interface (VAAPI) which is interposed between a hardware layer and a software layer. For detailed description of VAAPI, please refer to infra. The present invention intendes to create or modify existing storage virtualization applications to take advantage of the fast path acceleration provided by storage data management silicon, which is included in a commonly assigned application, entitled STORAGE MANAGEMENT PROCESSOR, provisional application No. 60/427,593, filed on Nov. 19, 2002. Further, VAAPI is a strategy to bring concurrence within the storage virtualization industry for the use of a common platform. By providing hardware-assisted data movement and related functionality through VAAPI, virualization application vendors can boost their performance while positioning their technology on an open platform.

Figure 1:
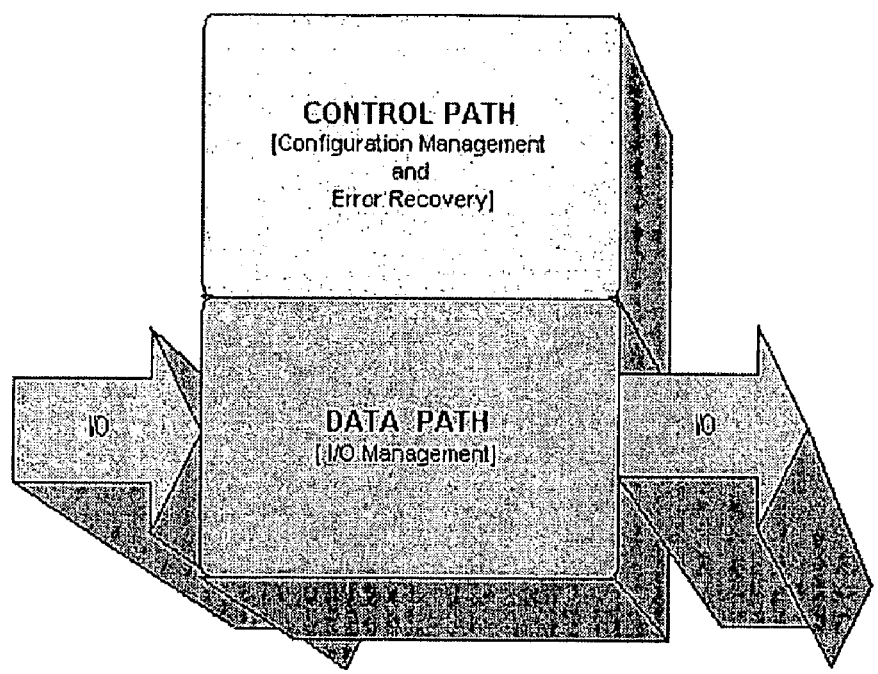
FIG. 1 is a prior art storage system depiction.
Figure 2:
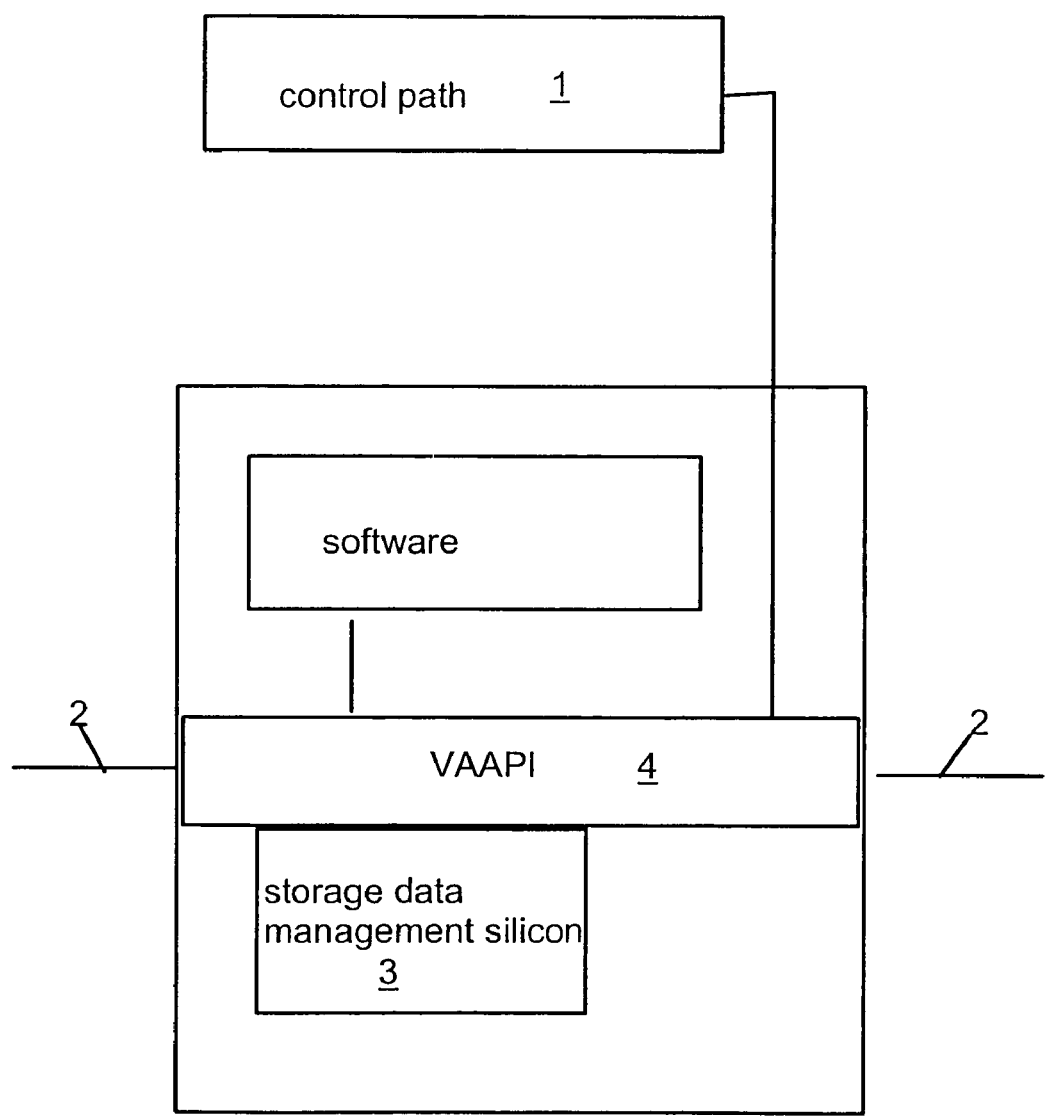
FIG. 2 is a depiction of the present invention.

Referring to FIG. 2, VAAPI 4 is a storage network I/O handling framework and a set of APIs for the following purposes. The purposeses include: enabling separation of a control path 1 (configuration and complex exception handling) and data path 2 (storage I/O execution and relatively simpler exception handling) related computing. The data path 2 processing is kept relatively simple in comparison to control path 1 processing and data path 2 is being accelerated with specialized HW for achieving higher performance. VAAPI 4 further defines abstracted interfaces to the configuration information repository from the Storage Management applications in the control path 1; and defines a set of APIs for device configuration, configuration loading, exception reporting and access to HW accelerated I/O processing pipeline in a storage management processor 3 (silicon).

VAAPI 4 resides in the datapath 2 and is a mechanism for implementing the steady state portion of I/O in hardware for maximum performance. A storage virualization map (not shown) is created in the control portion 1 of the storage virtualization and is then pushed to the silicon 3 via the VAAPI interface 4. If no exceptions to the I/O occur, it is handled completely in the storage data management silicon 3 with no external processor (not shown) intervention. In the case of exceptions, the VAAPI framework 4 is able to push the I/O and the exception to the external processor for processing. The VAAPI framework 4 allows for dynamic updates of the mapping tables maintained in the storage data management silicon 3. Changes in configurations can occur during runtime via the control portion 1 and be pushed to the silicon 3 via VAAPI 4 without requiring I/O interruption.

The steady state component of the data path 2 that is implemented in the storage data management silicon 3 is referred to as the Accelerated Path (AP).

Figure 3:
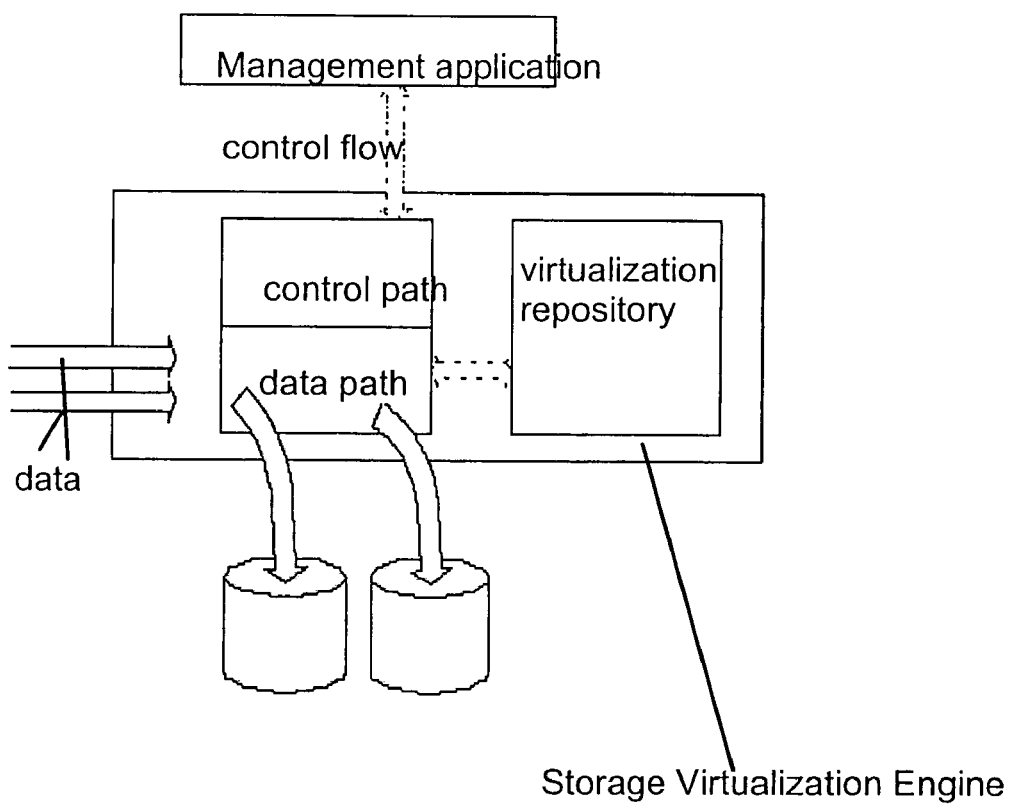
FIG. 3 is a prior art storage system.

A typical prior art enterprise vendor solution is shown in FIG. 3.

Figure 4:
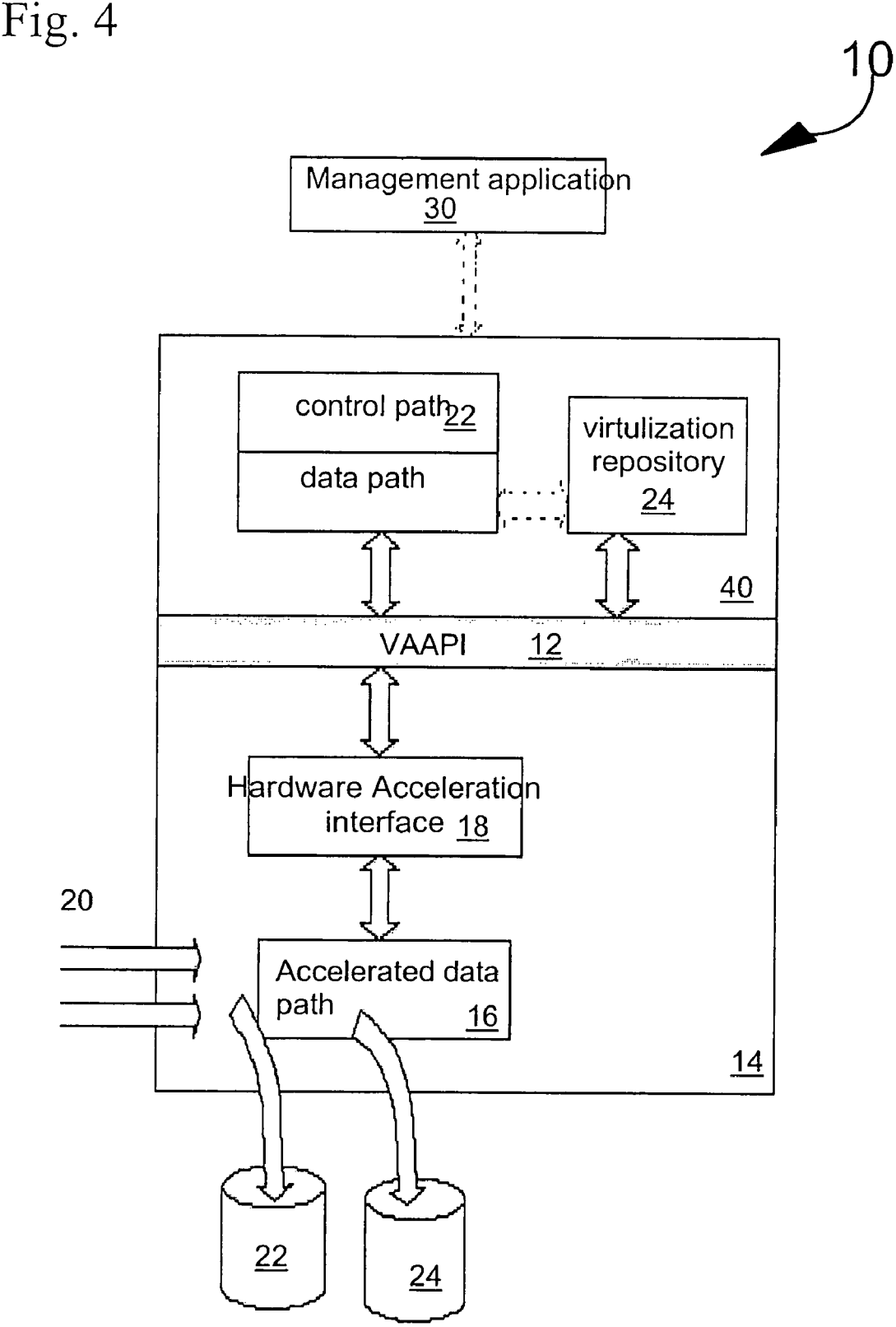
FIG. 4 is a first depiction of the present invention.

The present invention provides the VAAPI which may operate in new virtualization environments that use Common Information Model/Web Based Enterprise Management (CIM/WBEM) interfaces look like the one shown in FIG. 4. Compared with FIG. 3, the interface of the present invention includes a VAAPI layer 12 interposed between a hardware subsystem 14 which includes an accelerated data path 16 and a hardware acceleration interface 18. Hardware subsystem 14 is adapted to receive data flow 20, which terminates at terminating points 22, 24. Terminating points 22, 24 may be such devices as hard disks, virtual disks, or tapes. Hardware acceleration interface 18 is interposed between accelerated data path 16 and VAAPI layer 12.

In the present invention, such as in the CIM-based approach, necessary strategic foundations are provided while offering a common basis for adapting to a variety of other environments such as those using Simple Network Management Protocol (SNMP) or proprietary protocols.

Further, the present invention comtemplates a system that has a management application component 30 and a Virtualization Engine 40. The management application 30 generates and handles the control path information. For example, it may use CIM/WEBM-based interfaces to exchange control information with the Virtualization Engine 40, which is implemented in the hardware.

As can be seen, the present invention provides VAAPI layer 12 and hardware subsystem 14 over prior art systems such as the one shown in FIG. 3.

The control path 22 may populate a virtualization repository 24 such as the CIM-based repository using standard CIM/WBEM formats. A Mapping Table (not shown) is implemented in the hardware and provides the mapping from the virtual storage to the physical storage. The CIM-base repository 24 provides the static information for the storage mapping in the hardware.

Figure 5:
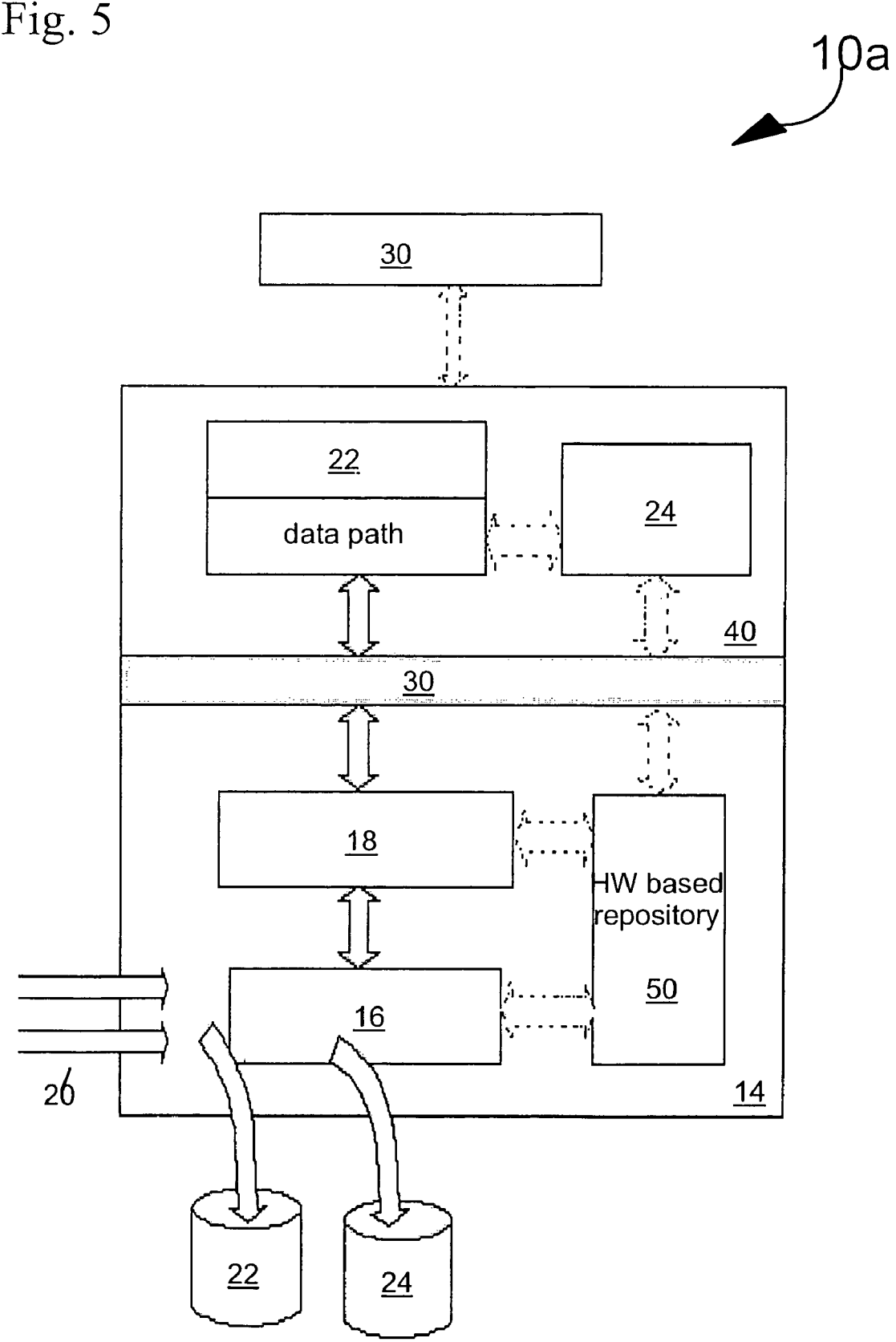
FIG. 5 is a second depiction of the present invention.

FIG. 5 illustrates the VAAPI support for a virtualization application using SNMP or proprietary protocols. As can be seen, a CIM based repository 50 is required. Repository 50 is implemented in hardware and is coupled to VAAPI 12, hardware acceleration interface 18 and accelerated data path 16 respectively.

Figure 6:
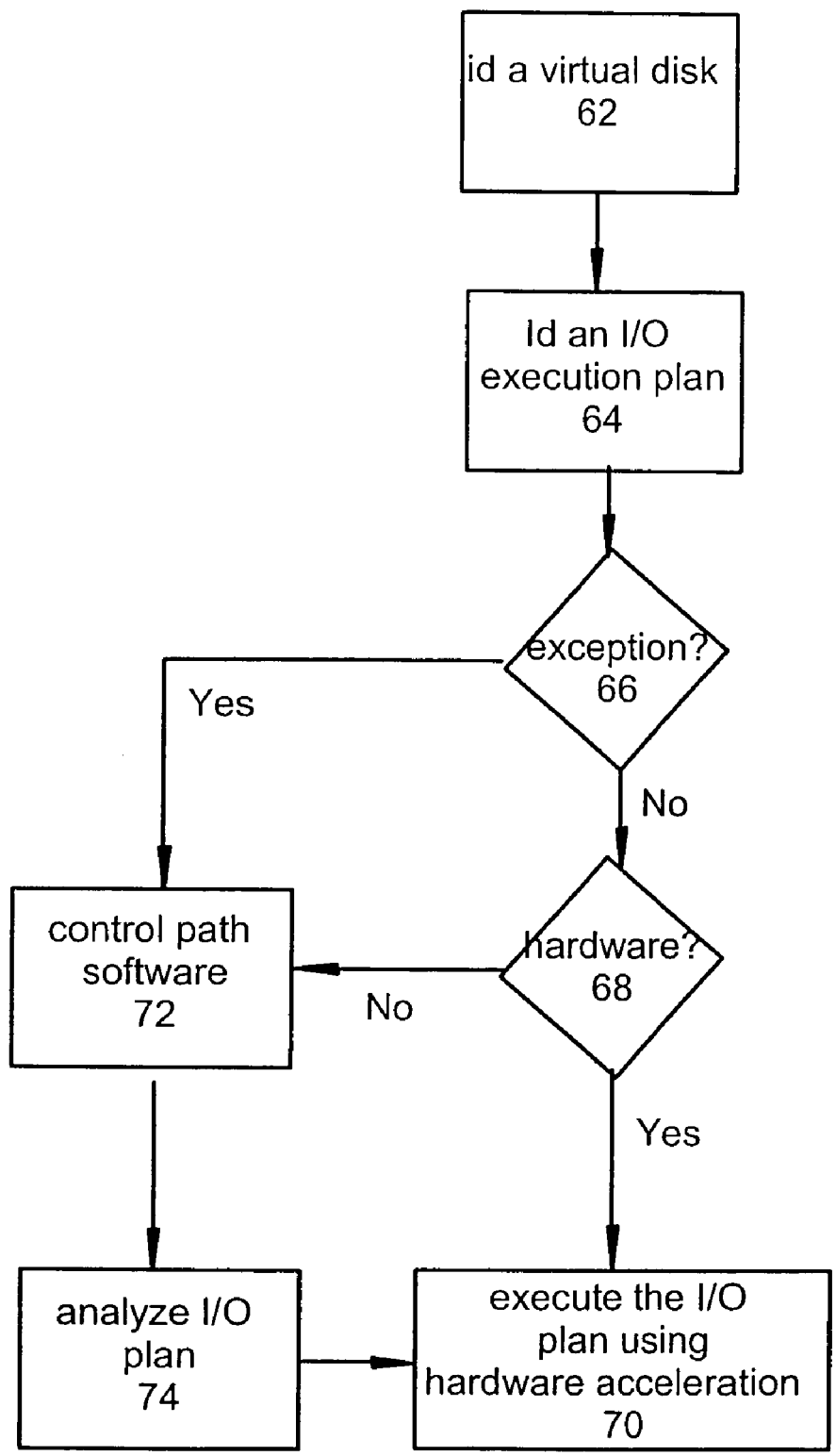
FIG. 6 is a flowchart of the present invention.

In FIG. 6 there are two repositories shown, one for the software environment and one for the hardware environment. The software repository 24 supports existing vendor's current protocols and related data structures. The hardware repository 50 supports CIM/WBEM and is provided by the hardware acceleration vendor. The two repositories 24, 50 need to populate each other and maintain a certain level of synchronization. This functionality is, in part, accomplished by the VAAPI interface 12.

Along with normal data and address flows 20, VAAPI 12 also supports delegation of high-usage control functions from the software virtualization engine 40 to the hardware virtualization engine 14. This transfer helps improve data rates and related performances. In order to accomplish this delegation function, VAAPI 12 must also include the interfaces for the software control path 22 module to interact with the hardware acceleration engine 14. This permits VAAPI 12 to handle some of the exception conditions that are normally handled by the current software-based Control Path component.

The overall processing of an I/O is shown in a flowchart 60 of FIG. 6. Referring to FIG. 6, a virtual disk for an I/O is identified from the transport protocol information and validated for proper access and proper client, etc (step 62). An appropriate I/O execution plan is identified for the I/O request; the logical block addresses are translated to physical block addresses and the corresponding physical devices are identified (step 64). If the I/O plan can be handled by the acceleration hardware, then the I/O is handed off to the I/O plan executor hardware (step 66). If it is determined that the I/O plan is not executable by the acceleration hardware, it is then sent to the control path software (step 68). In case of any exception in the I/O plan, the plan is sent to the control path software (step 70). The control path software analyzes the incoming I/O plans (step 72), and after performing required I/O operations and/or I/O exception processing operations (step 74), resubmits the original I/O plan to the acceleration hardware.

Figure 7:
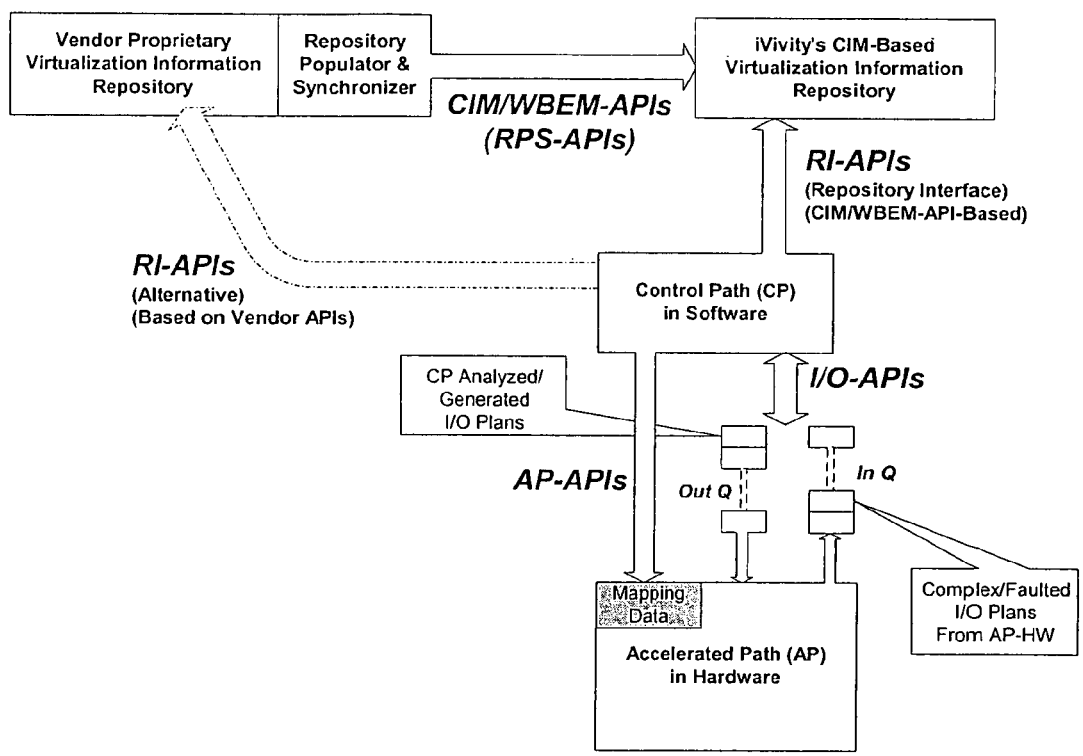
FIG. 7 is a depiction of input/output processing of the present invention.

FIG. 7 shows an input/output processing of a storage virtualization engine.

To accomplish the previously-described hardware/software-based shared processing scheme, there are requirements for sharing information and control at various places within the hardware storage virtualization environment. These interface points are broadly defined in terms of the following API groups. The groups are CIM/WBEM APIs, RI-APIs, alternative RI-APIs, AP-APIs, I/O-APIs, and UA-APIs.

CIM/WBEM APIs are Standard CIM/WBEM APIs used to access a CIM implementation. These APIs are defined in CIM/WBEM standards documents. RI-APIs are APIs used by the control path software for interfacing with the storage virtualization information repository. Implementation of this API group is preferably based on top of CIM/WBEM APIs with the repository related software provided. RI-APIs (Alternative) are, if the storage virtualization information repository of a vendor is such that the repository could not be translated to a CIM repository, then the RI-APIs are to be implemented on top of vendor-provided APIs. AP-APIs are APIs the control path software uses to populate the acceleration hardware with the storage virtualization information that it gets with the RI-APIs. I/O-APIs are APIs used in the control path software for sharing the control and data related to an I/O plan with the acceleration hardware. UA-APIs are APIs that provide utility functions, (e.g. Free buffers, etc.)

Repository Population and Synchronization (RPS-APIs)

The repository used by the hardware (AP) environment is an implementation of standard CIM model with standard CIM/WBEM APIs that are supported over an HTTPS/XML protocol. These APIs are not described in this document since they are described elsewhere in standards documents.

Repository Interface (RI-APIs) and Accelerated Path (AP-APIs)

The AP-APIs and the corresponding RI-APIs are further classified into the following groups based on their information content. Normally, for any AP-APIs, there will be a complimentary API in the RI-API.

The following are subcategories associated with VAAPI. These configurations are Virtual Disk Configuration, Storage Services Configuration, I/O Plan Exception Handling Configuration, CP-AP Shared I/O plans, AP Pass-through I/O plans, Physical Devices Discovery and Management, CP-AP Transaction Management, Event Handling, Performance and Statistics, and Utility Functions.

Virtual Disk Configuration

This group of APIs deals with configuration related to individual virtual disk and basic virtualization (i.e., disk concatenation and striping). In the VAAPI framework, I/Os that requires involvement of multiple virtual disks are categorized as Storage Services related I/Os. For example, mirroring, snapshot, on-line migration etc. are termed as storage services and configuration requirements for these services are handled through a group of APIs termed as Storage Services Configuration that is described later.

The following are examples of VAAPIs of the present invention. The prefixes used to mark this group of APIs are RI (RepositoryInterface) and AP (Accelerated Path).

| | |
|---|---|
| RI_GetVDList_vaVendor | Gets the list of all virtual disks from the repository. |
| RI_GetVDInfo_vaVendor | Gets the information for a Virtual Disk from the repository. |
| RI_GetMapVD_vaVendor | Gets the full map of a virtual disk from the repository. |
| AP_SetMapVD_vaVendor | Sets the full map of a virtual disk in AP hardware, if a map already exists then it is replaced with the new one. |
| RI_GetClientInfo_vaVendor | Gets the information for a client from the repository. |
| AP_SetClientInfo_vaVendor | Sets the information for a Client in AP hardware. |
| RI_GetAclVD_vaVendor | Gets the ACL setup for a virtual disk. |
| AP_SetAclVD_vaVendor | Sets the ACL for a virtual disk in the AP hardware. |
| RI_GetAclVDClient_vaVendor | Gets the ACL setup for a Client for a virtual disk. |
| AP_SetAclVDClient_vaVendor | Sets the ACL setup for a Client for a virtual disk in AP hardware. |
| RI_GetCoSVD_vaVendor | Gets Class of Service for a virtual disk from the repository. |
| AP_SetCoSVD_vaVendor | Sets Class of Service for a virtual disk in AP hardware. |

| | |
|---|---|
| RI_GetCoSVDClient_vaVendor | Gets Class of Service for a Client for a virtual disk from the repository. |
| AP_SetCoSVDClient_vaVendor | Sets Class of Service for a Client for a virtual disk in AP hardware. |
| AP_SetStatusVD_vaVendor | Sets the status of a virtual disk. The state applies to all Clients on a virtual disk. (enable, disable, quiescent). |
| AP_SetStatusVDClient_vaVendor | Sets the status of a virtual disk for a Client in AP hardware. |
| RI_GetStatsCollectionDirectiveVD_vaVendor | Gets the statistics collection directive for a virtual disk from the repository. |
| AP_SetStatsCollectionDirectiveVD_vaVendor | Sets the statistics collection for a virtual disk in AP hardware. |
| RI_GetVDStorageSegment_vaVendor | Gets the map of a specific storage segment (in iDiSX terminology allocation) for a virtual disk from the repository. |
| AP_SetVDStorageSegment_vaVendor | Sets the map of a specific storage segment for a virtual disk in the acceleration path. This API could be used to replace part of the map of a VD in the accelerated path at allocation granularity. If the supplied allocation is immediately following the currently used allocation numbers of a VD (i.e., it is not present in the acceleration path) then this is interpreted as extending the size of a VD. |
| RI_GetVDStorageExtent_vaVendor | Gets the map of a specific storage extent within an allocation for a virtual disk from the repository. |
| AP_SetVDStorageExtent_vaVendor | Sets the map of a specific storage extent within an allocation for a virtual disk in the acceleration path. This API could be used to replace part of the map of a VD in the accelerated path at the storage extent granularity. |

Storage Services Configuration

This group of APIs deals with configuration related to various storage services applications like mirroring, snapshot, on-line migration, dynamic multi-path etc. This configuration group may involve more than one virtual disks. For example, establishing a mirror virtual disk for another virtual disk is done through an API in this group.

The prefixes used by this group of APIs are

SSRI (Storage Services Repository Interface) and

SSAP (Storage Services Accelerated Path).

| | |
|---|---|
| SSRI_GetIOPlan_vaVendor | For a given virtual disk, the API returns the list of other virtual disks that are associated with it in order to implement the currently configured storage services on the given virtual disk. For example, if for a virtual disk VD-A, there are two mirrors VD-A-m1 and VD-A-m2, then this API will return a list giving the identifications of VD-A-m1 and VD-A-m2 along with the information that they are both mirror devices of VD-A. |
| SSAP_SetIOPlan_vaVendor | For a given virtual disk, with the result of the API SSRI_GetIOPlan_vaVendor, this API will set up the I/O plan for the given virtual disk within the accelerated path. |
| SSAP_ModifyIOPlan_vaVendor | Modifies an existing I/O plan for a virtual disk in the accelerated path. For example, to remove the mirror VD-A-m1 from the virtual disk VD-A, this API will need to be used. |

I/O Plan Exception Handling Configuration

The APIs in this group provide configuration related to handling of exceptions in an I/O plan in the accelerated path.

The APIs are prefixed with PERI (Plan Exception Repository Interface) and PEAP (Plan Exception Accelerated Path).

| | |
|---|---|
| PERI_GetIOPlanParam_vaVendor | Gets the value of a given parameter from the repository for a given I/O plan component. For example, the time-out value for an I/O to a mirror virtual disk. The list of parameters will be defined during the course of the implementation as needs are identified. |

-continued

| | |
|---|---|
| PEAP_SetIOPlanParam_vaVendor | This API will set up the value of a given parameter in an I/O plan within the accelerated path. |
| PEAP_IOPlanContinuationMask_vaVendor | The API sets a mask in order to determine if the I/O plan execution for an I/O should continue in case of failure of an I/O plan component |
| PEAP_IOPlanSuccessMask_vaVendor | The API sets a mask in order to determine if the I/O from a client on a virtual disk is to be reported as a success or failure. For example, in one storage management environment, it may be set so that I/O to all mirrors in a plan must succeed in order to report success to an I/O client. But, if the virtual disk exposed to the client is based on a RAID-5 device, then a determination could be made to succeed the client I/O even if all the mirrors in the I/O plan fail |
| PEAP_IOPlanLogMask_vaVendor | he API sets up a mask in order to determine which I/O components of an I/O plan need to be logged in case of failure. Also provided in this mask is information regarding whether the original data needs to be logged or not. For example, in case of a failure of a replication component - in one I/O plan, it may be decided |
| PEAP_VDDeactivateMask_vaVendor | The API sets up a mask in order to determine if failure of an I/O component results in making a virtual disk unavailable to the clients. The client access is resumed only when the status of the virtual disk is modified from the control path software |

CP-AP Shared I/O Plans

The I/O APIs provide the facility for dealing with I/Os that are generated in the acceleration path and then handled through the control path in case of I/O exception. These APIs are prefixed with IO.

a note about ownership of an I/O plan. At any point in time, an I/O plan is either owned by the accelerated path hardware or the control path software. By default the APIs deal with the I/O plans that are not owned by the accelerated path. The APIs that deal with I/O plans owned by the accelerated path are suffixed with Inap.

| | |
|---|---|
| IO_GetPlan_vaVendor | Gets the first I/O plan that was sent from the accelerated path to the control path software. |
| IO_GetPlanVD_vaVendor | Gets the first I/O plan for a virtual disk that was sent from the accelerated path to the control path software. |
| IO_GetPlanVDAllInapva_vaVendor | Gets a list of all the outstanding I/O plans for a virtual disk in the accelerated path. These I/O plans have not yet encountered any exception. Based on a parameter, the owner of these plans is either kept unchanged or changed to the control path software as part of this list generation. |
| IO_ChgPlanVDOwnInap_vaVendor | Change the owner of an I/O Plan from the accelerated path to the control path. |
| IO_ResubmitPlan_vaVendor | Control path software puts back an I/O plan after doing necessary handling of the exception(s) in the I/O plan. |
| IO_AbortPlan_vaVendor | Aborts an I/O plan. |
| IO_SubmitPlan_vaVendor | For data movement from one virtual disk to another virtual disk, the control path software may generate an I/O plan itself and submit it to the accelerated path with this API. |
| IO_AddDivertRange_vaVendor | For a given virtual disk, add a block range to the acceleration path so that I/Os involving the block range are diverted to the control path software. |
| IO_RemoveDivertRange_vaVendor | For a given virtual disk, remove a previously specified block range from the acceleration path. |
| IO_PlanStatusDecode_vaVendor | Decodes the processing status of the I/O plan components and provides the next I/O component on which exception occurred |

AP Pass-Through I/O Plans

These APIs are used to create I/O plans from the control path and send it to the devices in a passthrough mode through the acceleration path. These APIs are prefixed with IOP.

| | |
|---|---|
| IOP_CreateIOPlan_vaVendor | This creates a new IO plan, which can further be filled with IO commands |
| IOP_AddIO_vaVendor | An IO is added to the IO plan |
| IOP_ChangeIO_vaVendor | The information of an IO is changed |
| IOP_GetErrorCode_vaVendor | Returns the error code for a given IO in the IO plan |
| IOP_ReInitIOPlan_vaVendor | Re-initializes the IO plan |
| IOP_DestroyIOPlan_vaVendor | This releases the IO plan resources |
| IOP_AllocPayIdSGLBuf_vaVendor | If user wants to send down the payload in the form of SGL, he should build the SGL on the 256-byte memory area provided by this API |
| IOP_FreePayIdSGLBuf_vaVendor | Free the above-allocated SGL buffer |

Devices Discovery and Management

The following APIs are related to devices discovery and management.

ISCSI Management APIs

| | |
|---|---|
| ISCSIAPI_Get_Global_Params | Gets the global ISCSI parameters from the repository. |
| ISCSIAPI_Get_Target_List | Gets the Target List from the repository. |
| ISCSIAPI_Get_Target_Info | Gets the information for a Target from the repository. |
| ISCSIAPI_Get_Initiator_List_VD | Gets the Initiator List for a VD from the repository. |
| ISCSIAPI_Get_Initiator_List_Target | Gets the Initiator List for a Target from the repository. |
| UA_FreeBuffPointer_vaVendor | Free the allocated buffer. |

CP-AP Transaction Management

These APIs are used to provide a transaction management facility for updating the shared data structures between the control path and the acceleration path in a way that preserves the integrity of the modified data with respect to its use by multiple processors.

These APIs are prefixed with TXCP for the control path part and TXAP for the acceleration path.

Event Handling

In case of any exception while processing an I/O from a client according to an I/O plan, the complete I/O plan along with the data is made available to the control path software. The APIs in this group provide the facilities to decode information from the I/O plans. Also, this API group provides APIs for determining the recipients of the exception information and APIs for sending the exception information.

The APIs in this group are prefixed with EHRI (Event Handling Repository Interface) and EHAP (Event Handling Accelerated Path).

| | |
|---|---|
| EHAP_Register_EventHandler_vaVendor | This API registers a function that is called for a particular type of event. |
| EHAP_UnRegister_EventHandler_vaVendor | This API un-registers the event handler. |
| EHRI_EventReportingSetup_vaVendor | This API sets up the infrastructure for the control path software for reporting events. |
| EHRI_SendEvent_vaVendor | This API sends the event to whoever has registered for receiving the event. |

Performance and Statistics

This API group provides access to various performance related counters and values in the accelerated path of the Storage Virtualization Engine. The API group is prefixed with PSRI (PerformanceStatisticsRepositoryInterface) and PSAP (PerformanceStatisticsAcceleratedPath).

| | |
|---|---|
| PSRI_UpdateVDStats_vaVendor | Updates all the statistics in the repository for a given virtual disk |
| PSAP_CopyVDStats_vaVendor | Gets all the statistics for a given virtual disk from the accelerated path hardware to a designated area in memory |
| PSAP_ResetVDStats_vaVendor | Resets all statistics for a virtual disk in the accelerated path |
| PSAP_GetMapSizeVD_vaVendor | Gets the map size for a virtual disk |
| PSAP_GetMemReqVD_vaVendor | Gets the full memory requirement for the virtual disk in the SVE |

Utility APIs

These APIs will provide utility functions and are prefixed with UA. Two examples of the API in this category are:

| | |
|---|---|
| UA_FreeBuffPtoPArray_vaVendor | This will free all buffers related to an API that requires a parameter of pointer to an array of pointers |
| UA_FreeBuffPointer_vaVendor | This will free the buffer pointed by the pointer |

Briefly, the following changes need to be implemented in an existing virtualization environment to utilize VAAPI with hardware acceleration. The primary driver will supports API calls, including the verbs and formats, as specified in VAAPI. The following identifies several of the important areas of impact.

If the Information Repository of the existing application is not CIM-based, the vendor will either need to convert the existing SNMP or proprietary formats into the CIM object model so that the current VAAPI implementation can get required information from the CIM or the vendor needs to implement the repository interface components of VAAPI on top of the proprietary repository.

The hardware acceleration component may not be able to handle certain error conditions. These error conditions need to be forwarded to the existing virtualization engine (software-based) to process and report them. The vendor needs to provide entry points into the existing code to allow this access The data path and control path of the existing software-based virtualization engine will also need to support the hardware-based accelerated data path through VAAPI. This will require changes to the control path and data path components of the virtualization engine One embodiment of the invention is implemented as a program product for use with a computer system such as, for example, the storage network environment as shown in FIGS. 4 and 5 and described below. The program(s) of the program product defines functions of the embodiments (including the methods described below with reference to FIGS. 6 and 7 and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Further, the program product can be embedded within a processor such as a storage network processor. The processor may be embodied in an adapter card of a server or other type of computer work station.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to embodiments of the present invention, other and further embodiments of the invention may be devised without departing from the basic scope thereof, and the scope thereof is determined by the claims that follow.

The invention claimed is:

1. A storage virtualization engine, the engine comprising:
   a software sub-engine having a control path;
   a virtualization repository;
   a hardware sub-engine having an accelerated path;
   an interface coupling the software sub-engine with the hardware sub-engine,
   whereby a function is passed from the hardware sub-engine to the software sub-engine.

2. The system of claim 1, further comprising:
   the software sub-engine creates a new I/O plan which is passed from the software sub-engine to the hardware sub-engine.

* * * * *